United States Patent Office 2,699,182
Patented Jan. 11, 1955

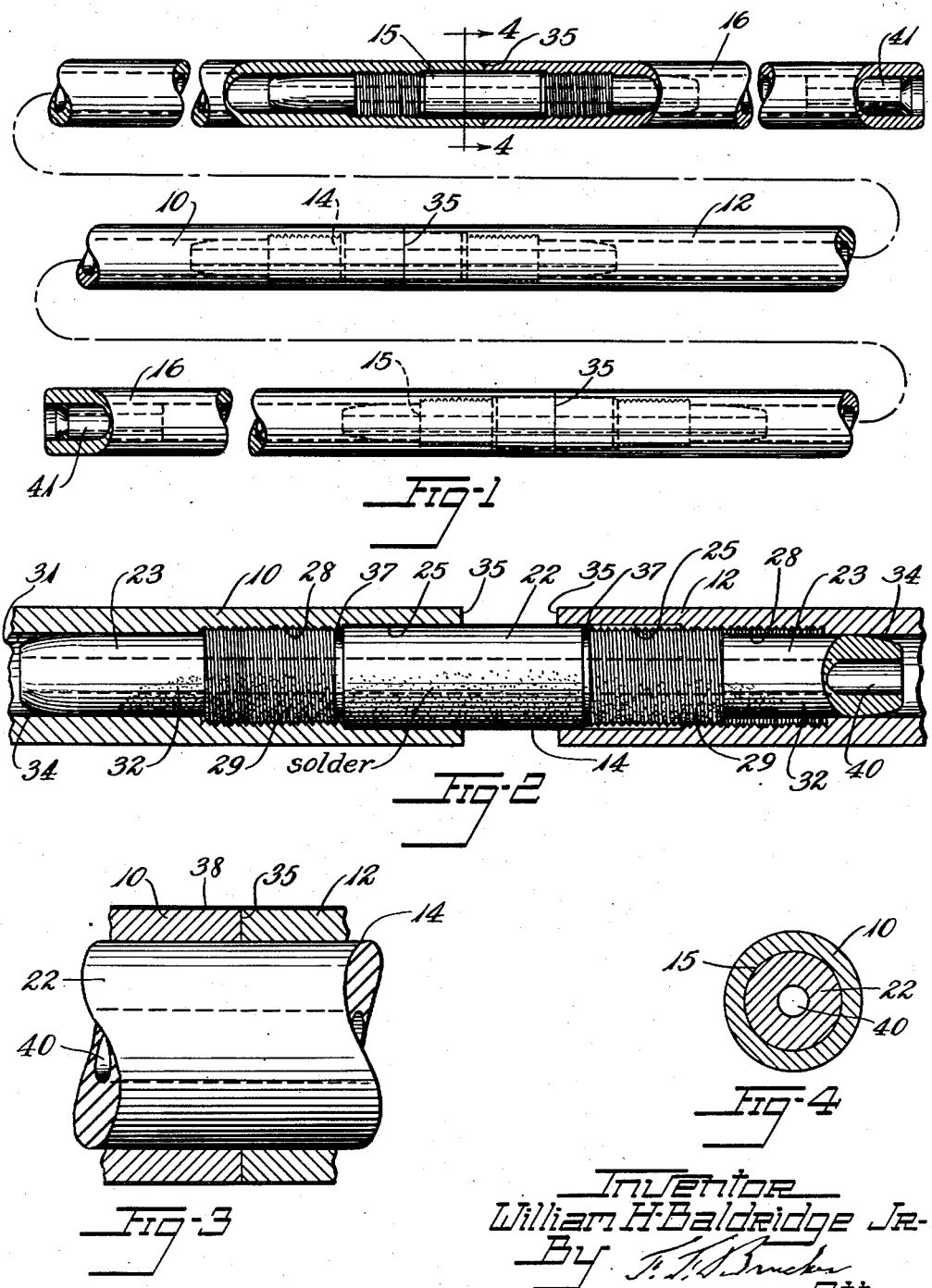

2,699,182

MANDREL FOR BUILDING SMOOTH-BORE HOSE

William H. Baldridge, Jr., Rittman, Ohio, assignor to The B. F. Goodrich Company, New York, N. Y., a corporation of New York Application October 30, 1951, Serial No. 253,925

3 Claims. (Cl. 138—47)

This invention relates to the manufacture of hose and more especially it relates to an improved mandrel on which hose may be built and cured.

Certain types of mechanical equipment, particularly jet aircraft, rockets and the like require flexible, reinforced hose having a perfectly smooth bore for carrying fuels or lubricants. These fluids flow through the hose at such high velocity that the slightest irregularity, mar, or other blemish on the internal surface of the hose may cause undesirable heat to be generated or may cause turbulence in the flow which would adversely affect the operation of the equipment. Although recent developments in reaction-thrust engines and the like have stimulated demand for smooth-bore hose, this demand has existed but has not been satisfied in food processing industries for many years. For example, in handling edible liquids in canneries, dairies, breweries, distilleries, etc., smooth-bore hose would advantageously prevent the accumulation inside the hose of food particles which are very difficult to clean out and which if permitted to remain would spoil and result in unsanitary conditions. Prior to the present invention it has not been possible to produce smooth-bore hose on an economical basis.

An object of this invention is to provide for manufacturing flexible, smooth-bore hose in lengths as long as sixty feet and more. Another object is to provide a mandrel on which the hose may be built and cured, the mandrel having a smooth, polished exterior surface from one end to the other end and perfectly round. Another object is to provide a long mandrel formed by uniting two or more straight members end-to-end and to provide for uniting the several lengths by means capable of withstanding the high flexing stresses to which the mandrel is subjected as the hose is being built thereon. A further and important object is to provide for removing the ends of the mandrel after the ends have been damaged or scarred in service and for replacing these portions of the mandrel with new ends.

These and other objects will be more fully apparent from the following description of the invention in connection with the drawings.

In the drawings:

Fig. 1 shows a mandrel formed according to this invention, portions of the mandrel being broken away to show the internal structure;

Fig. 2 is a detailed view on an enlarged scale of a joint between the ends of two adjacent members of the mandrel, the joint being partially assembled;

Fig. 3 is a detailed sectional view on an enlarged scale of a portion of the joint of Fig. 2 after it is completely assembled; and Fig. 4 is a cross-sectional view on an enlarged scale taken on the line 4—4 of Fig. 1.

Smooth-bore hose is made on the mandrel of this invention according to ordinary hose-making procedures. Generally the mandrel is first covered with a layer of rubber or other elastomeric material and then the mandrel is moved through a succession of braiding machines where one or more layers of cord, wire, etc. are braided around the mandrel over additional layers of elastomeric material until the hose carcass is formed to the desired thickness. The mandrel is advantageously formed with tubular members in order to reduce the weight of the mandrel to avoid excessive loads on the braiding machines, and also to permit steam or other heating medium to be introduced into the mandrel as the hose is being cured. Preferably the tubular members are steel. As shown in Fig. 1 the structure of the mandrel includes two long tubular members 10 and 12 which are connected together end-to-end at the center of the mandrel by an insert 14. The outer end of each of these tubular members is connected by an insert 15 to a short end member 16 which is also tubular. The members 10 and 12 are each about thirty feet long, more or less, which is about as long as it is possible to obtain tubing commercially. The end members 16 are each less than about three feet long and these members are designed so that they may be removed for replacement from time to time. The total or over-all length of the mandrels will generally measure from about fifty feet to about sixty-five feet because the braiding and curing equipment will best accommodate a mandrel of about this length and it has been found that it is more economical to build the hose in these lengths.

The inserts 14 and 15 and the portions of the ends of the members into which these inserts fit must be made with precision so that the members fit tightly together and in exact alignment. Fig. 2 shows in detail the structure of insert 14 and the ends of the members 10 and 12 which the insert connects. The inserts 15 are substantially the same as insert 14 and the ends of the tubular members connected together by inserts 15 are formed substantially the same as the ends of members 10 and 12 shown in Fig. 2.

Insert 14 has a cylindrical body 22 with a projection 23 extending outwardly from each end of the body. Both the body 22 and the projections 23 fit inside and are completely enclosed by the tubular members. As indicated in Fig. 2 one projection 23 and about half of body 22 of insert 14 fit inside each tubular member at the center of the mandrel.

At the abutting end of each tubular member the internal diameter is machined to form a bore 25 which is exactly concentric with the outside surface of the tubing and which is deep enough to receive about half of the body 22 of the insert. Leading inwardly from the bore 25 inside the tubular member there is an internal thread 28 to receive a corresponding external thread 29 formed on each projection 23. Next to the internal thread 28 in each tube there is a bore 31 which is of smaller diameter than bore 25 and which receives a shank 32 formed on each projection between thread 29 and the end of the projection. The shank 32 is longer than the internal thread 28 inside the tubing so that in assembling a joint the shank 32 will fit into bore 31 and center the insert in the tubing so that the threads may be started properly. The edge of each shank 32 is radiused at 34 so that as the mandrel is flexed and vibrated as it moves through the braiders the stress applied to the tubing walls by the action of the shank is distributed over a wide area and the end of the shank 32 can not gouge or weaken the adjacent wall of the tubular members. The radius 34 prevents the formation of ridges or cracks being formed on the exterior surface of the mandrel due to the flexure.

The bore 25 fits quite closely around the body 23 to prevent lateral movement between the abutting ends of the tubular members which results from the clearances in the threads. As is subsequently explained, the ends of the tubular members are heated before assembly with the insert to expand the dimensions of the bore 25 and therefore permit relative longitudinal movement between the bore and the body as a tubular member is screwed onto thread 28 to assemble a joint. When the threads of each tube are fully tightened on the insert the tubes abut each other on smooth, annular surfaces 35. These surfaces are ground perfectly square with the longitudinal axis of the mandrel so that the ends of the tubes abut each other tightly.

Between the body 22 and each thread 29 the insert is undercut to form a narrow groove 37 in which solder or other fusible material is placed before the tubes are screwed onto the insert. Before assembly the insert is heated and it is also dipped into a bath of molten solder or other fusible material to coat the insert. The ends of the tubular members are also heated but these ends are heated at least thirty degrees hotter than the insert. After the joint is assembled and allowed to cool the solder hardens to fill whatever clearances may exist in the bore 25 around body 22 and also around shank 32 so that the insert is bonded to the tubular members and the joint can not thereafter be disassembled unless it is reheated to melt the solder. The solder prevents the threads 28 and 29 from becoming unscrewed due to the severe vibration to which the mandrel is subjected in the braiding machine. Due to the differences in the temperatures to which the insert and tubular members are heated the tubular members form a shrink fit around the inserts which further strengthens the joint.

The end members 16 are fastened by the inserts 15 with solder, etc. in axial alignment with and abutting the outer ends of members 10 and 12. The end members 16 also have annular end surfaces 35 so that the exterior surface of each end member is flush with the exterior surface of the members 10 and 12. After assembly of all the tubular members the exterior surface of the mandrel is ground on a belt grinder or the like to remove all pits and scratches. Next the exterior surface is covered with a thin skin 38 (see Fig. 3) of hard-surfaced material such as chromium deposited by electro-plating. This skin 38 may be several thousandths of an inch in thickness and it covers the mandrel such that the joints formed by the abutting ends of the various tubular members are concealed and cannot be detected. The final step in constructing the mandrel is to polish the skin 38 with jewelers rouge or the like to form a lustrous exterior surface which is adapted to be covered with the first layer of rubber when the hose is built.

Through the insert 14 and each of the inserts 15 there is an axial extending hole or passage 40 so that the mandrel is open from one end to the other to permit steam or other fluid used in curing the hose to flow freely through the mandrel. The outer end of each of the end members 16 has a cylindrical plug 41 welded inside the end of the members. These plugs serve to reinforce the ends and bars may be inserted into these plugs for lifting and handling the mandrel.

To remove a hose after it has been built and cured on the mandrel the ends of the hose are ordinarily cut away from the mandrel by using hack saws or the like. Since the saws are very hard they will scar and cut the skin 38 on the end members 16 to such an extent that the mandrel is in time after repeated use no longer usable because of its damaged ends. The mandrel may be repaired by heating the end members 16 in the vicinity of the joints formed by the inserts 15 to melt the solder around the inserts and then the old end members 16 are unscrewed from the inserts 15 and new end members are screwed onto the inserts 15, resoldered, etc. as explained above. The additional repair steps are then the same as the steps required in making a new mandrel, viz., the mandrel is ground, chrome-plated from end-to-end, and then polished with jewelers rouge to its original finish.

The solder used is preferably a tin base solder which flows at temperatures from about 450° F. to about 550° F. so that the joint is not weakened when the mandrel is heated during the vulcanization process.

Variations may be made without departing from the scope of the invention as it is defined in the appended claims.

I claim:

1. A mandrel for building smooth-bore hose comprising a plurality of cylindrical tubular members of uniform external diameter throughout their respective lengths, the members being disposed end-to-end and having end faces in abutting relation and having the external surfaces of the members flush with each other, and an insert connecting together each pair of abutting ends of the members, each insert including a central cylindrical body with axial oppositely-extending projections at the ends of the body, the body and said projections fitting wholly inside the abutting ends of the tubular members and being enclosed thereby, an external thread on a portion of each projection adjacent the body and an internal thread in the ends of the members which receive the insert to engage said external thread, and each projection terminating in a shank which extends into the tubular members beyond said internal thread, each shank having a surface at its extremity curved away from the walls of the tubular members to avoid localized concentration of pressure on the members when the mandrel is flexed, a bore in each abutting end of the tubular members between said end face and said internal thread receiving a portion of the body of the insert in closely fitting relation to resist lateral displacement of the abutting ends of the members, fusible material beteween said internal and external threads, and a skin of hard metal covering the outside surface of the tubular members and of sufficient thickness to conceal the place at which the ends of the tubular members abut each other.

2. A mandrel for building smooth-bore hose comprising a pair of cylindrical tubular members of uniform external diameter throughout their respective lengths, the members being disposed end-to-end and having end faces in abutting relation and having the external surfaces of the members flush with each other, and an insert projecting axially into each abutting end of the tubular members and wholly enclosed by said ends of the members connecting the tubular members in said abutting relation, the insert comprising a central cylindrical body having an axial projection extending from opposite ends of the body into said tubular members, an external thread of smaller diameter than the body on each projection adjacent the body, and each projection terminating in a shank the surface of which at its outer extremity is curved away from the tubular members to avoid localized concentration of pressure on the walls of the members when the mandrel is flexed, each of the tubular members having an internal thread engaged with said external thread and having a bore between said internal thread and said end face receiving a portion of said body of the insert, the portion of each tubular member containing the bore being shrink-fitted to the body to provide pressure engagement of the bore with the body at normal operating temperatures to resist lateral displacement of the abutting ends of the members, fusible material between said threads of said insert and the tubular members of a type which liquifies at temperatures greater thaan the vulcanizing temperature of a rubber hose on the mandrel for locking the threads, and a skin of hard metal covering the external surfaces of the tubular members and of sufficient thickness to conceal the place at which the end faces of the members abut each other.

3. A mandrel for building smooth-bore hose comprising first and second cylindrical tubular members of uniform external diameter throughout their respective lengths, the members being disposed end-to-end and having end faces mating in abutting relation and having the external surfaces of the members flush with each other, and connecting means projecting from the end of said first member axially into the abutting end of said second member and wholly enclosed by said members fastening the members in said abutting relation, the connecting means comprising a cylindrical body portion having an axial projection extending into said second member, an external thread of smaller diameter than the body formed on the projection close to the body, and the projection terminating in a shank the surface of which at its outer extremity is curved away from the walls of said second member to avoid localized concentration of pressure on the walls of the members when the mandrel is flexed, said second tubular member having an internal thread engaged with said external thread and having a bore between said internal thread and said end face receiving said projecting cylindrical body of the connector, the portion of the second member containing said bore being shrink-fitted to the body to provide pressure engagement of the bore with the body at normal operating temperatures, fusible material between said threads of the connector and the member of a type which liquifies at temperatures greater thaan the vulcanizing temperature of a rubber hose on the mandrel for locking the threads, and a skin of hard metal covering the external surfaces of the members and of sufficient thickness to conceal the place at which the end faces of the members abut each other.

References Cited in the file of this patent

UNITED STATES PATENTS

| Number | Name | Date |
|---|---|---|
| 95,614 | Spear | Oct. 5, 1869 |
| 330,873 | Cobb | Nov. 24, 1885 |
| 355,216 | Safford | Dec. 28, 1886 |
| 376,750 | Murphy | Jan. 24, 1888 |
| 1,188,485 | Pruyn | June 27, 1916 |
| 1,218,621 | Blumenthal | Mar. 13, 1917 |
| 1,273,859 | Hochberger | July 30, 1918 |
| 2,145,168 | Flagg | Jan. 24, 1939 |
| 2,152,962 | Ice | Apr. 4, 1939 |
| 2,284,754 | McGarry | June 2, 1942 |
| 2,379,990 | Rembert | July 10, 1945 |